US012705548B2

(12) United States Patent
Joo

(10) Patent No.: US 12,705,548 B2
(45) Date of Patent: Aug. 11, 2026

(54) METHOD TO DECIDE A LABELING PRIORITY TO A DATA

(71) Applicant: SuaLab Co., Ltd., Seoul (KR)

(72) Inventor: Mingyu Joo, Seoul (KR)

(73) Assignee: SuaLab Co., Ltd., Seoul (KR)

( * ) Notice: Subject to any disclaimer, the term of this patent is extended or adjusted under 35 U.S.C. 154(b) by 650 days.

(21) Appl. No.: 16/936,180

(22) Filed: Jul. 22, 2020

(65) Prior Publication Data

US 2021/0027143 A1 Jan. 28, 2021

(30) Foreign Application Priority Data

Jul. 26, 2019 (KR) ........................ 10-2019-0091059

(51) Int. Cl.
*G06N 20/20* (2019.01)
*G06F 16/23* (2019.01)
*G06F 16/28* (2019.01)
*G06N 3/0895* (2023.01)

(52) U.S. Cl.
CPC ......... *G06N 20/20* (2019.01); *G06F 16/2365* (2019.01); *G06F 16/285* (2019.01); *G06N 3/0895* (2023.01)

(58) Field of Classification Search
CPC .......... G06N 3/045; G06N 3/08; G06N 3/084; G06N 20/20; G06N 20/00; G06F 16/2365; G06F 16/285; G06F 16/55
See application file for complete search history.

(56) References Cited

U.S. PATENT DOCUMENTS

2018/0240031 A1 8/2018 Huszar et al.
2018/0330280 A1 11/2018 Erenrich et al.
2018/0336481 A1 11/2018 Guttmann
2018/0336509 A1* 11/2018 Guttmann ........ G06Q 10/06311

FOREIGN PATENT DOCUMENTS

JP 2015129988 A 7/2015
KR 1020130063565 A 6/2013
KR 101731626 B1 4/2017

OTHER PUBLICATIONS

Breuel, T. M. (2015). Benchmarking of LSTM networks. arXiv preprint arXiv:1508.02774. (Year: 2015).*

(Continued)

*Primary Examiner* — Kamran Afshar
*Assistant Examiner* — Lokesha Patel
(74) *Attorney, Agent, or Firm* — John D. Lanza; Foley Hoag LLP

(57) ABSTRACT

According to an exemplary embodiment of the present disclosure, a computer program stored in a computer readable storage medium is disclosed. The computer program may include instructions for causing one or more processors to perform the following steps, and the steps may include: generating a data subset including at least two or more data from an unlabeled entire dataset; generating two or more training datasets from the data subset, in which the two or more training datasets includes at least one pair of sampled data subset, and in which each of at least one pair of the sampled data subset includes different validation datasets; and training a plurality of inference models, based on the two or more training datasets and corresponding labeling values.

20 Claims, 12 Drawing Sheets

(56) References Cited

OTHER PUBLICATIONS

Nie, L., Wang, M., Zhang, L., Yan, S., Zhang, B., & Chua, T. S. (2015). Disease inference from health-related questions via sparse deep learning. IEEE Transactions on knowledge and Data Engineering, 27(8), 2107-2119. (Year: 2015).*
Yang, K. C., Niven, T., & Kao, H. Y. (2019). Fake news detection as natural language inference. arXiv preprint arXiv:1907.07347. (Year: 2019).*
Mo, W., Luo, X., Zhong, Y., & Jiang, W. (Jun. 2019). Image recognition using convolutional neural network combined with ensemble learning algorithm. In Journal of Physics: Conference Series (vol. 1237, No. 2, p. 022026). IOP Publishing (Year: 2019).*
Junaidi, A., & Fink, G. A. (Sep. 2011). A semi-supervised ensemble learning approach for character labeling with minimal human effort. In 2011 International Conference on Document Analysis and Recognition (pp. 259-263). IEEE. (Year: 2011).*
Japan Patent Office, Office Action, Application No. 2020-125751, Sep. 24, 2021, 3 pages.
Jorg D. Wichard, "Model Selection in an Ensemble Framework," Sheraton Vancouver Wall Centre Hotel, Vancouver, BC, Canada, Jul. 16-21, 2006, Downloaded from IEEE Xplore, pp. 2187-2192.
Korea Intellectual Property Office, Office Action, Oct. 25, 2020.
Myounggu Lee, Prediction of Driver Lane Change Intention Using Ensemble and Deep Learning Algorithms, The Graduate School of Automotive Engineering, Kookmin University, Seoul, Korea, 2015.
Keze Wang et al., "Cost-Effective Active Learning for Deep Image Classification", IEEE Transactions on Circuits and Systems for Video Technology, Jan. 2016.
European Office Action for Application No. 20187448.4 dated Jan. 27, 2021; 9 pages.

* cited by examiner

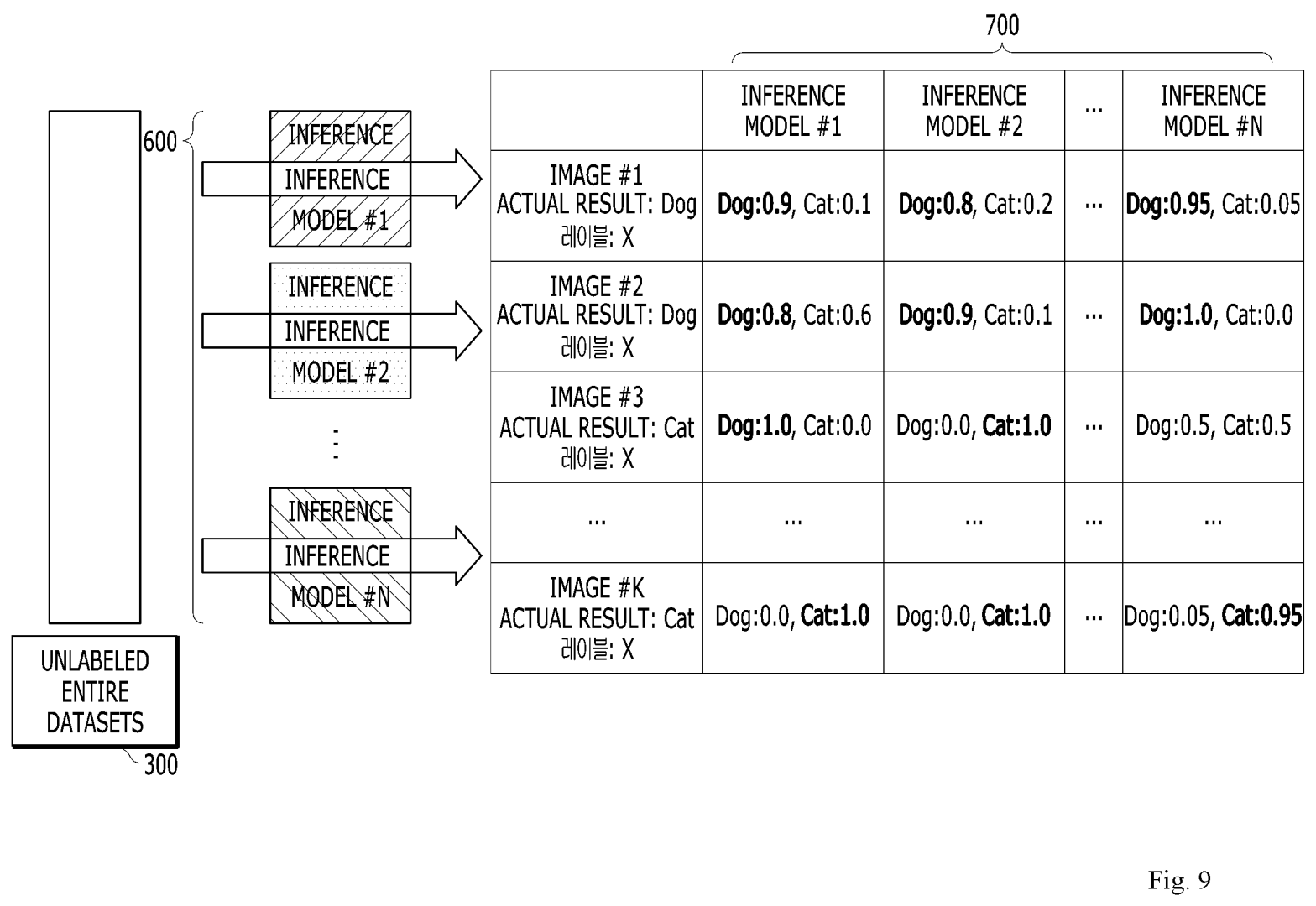

UNLABELED ENTIRE DATASETS
300
600
INFERENCE INFERENCE MODEL #1
INFERENCE INFERENCE MODEL #2
⋮
INFERENCE INFERENCE MODEL #N
700

| | INFERENCE MODEL #1 | INFERENCE MODEL #2 | … | INFERENCE MODEL #N |
|---|---|---|---|---|
| IMAGE #1<br>ACTUAL RESULT: Dog<br>레이블: X | **Dog:0.9**, Cat:0.1 | **Dog:0.8**, Cat:0.2 | … | **Dog:0.95**, Cat:0.05 |
| IMAGE #2<br>ACTUAL RESULT: Dog<br>레이블: X | **Dog:0.8**, Cat:0.6 | **Dog:0.9**, Cat:0.1 | … | **Dog:1.0**, Cat:0.0 |
| IMAGE #3<br>ACTUAL RESULT: Cat<br>레이블: X | **Dog:1.0**, Cat:0.0 | Dog:0.0, **Cat:1.0** | … | Dog:0.5, Cat:0.5 |
| … | … | … | … | … |
| IMAGE #K<br>ACTUAL RESULT: Cat<br>레이블: X | Dog:0.0, **Cat:1.0** | Dog:0.0, **Cat:1.0** | … | Dog:0.05, **Cat:0.95** |

Fig. 9

METHOD TO DECIDE A LABELING PRIORITY TO A DATA

CROSS-REFERENCE TO RELATED APPLICATIONS

This application claims priority to and the benefit of Korean Patent Application No. 10-2019-0091059 filed in the Korean Intellectual Property Office on Jul. 26, 2019, the entire contents of which are incorporated herein by reference.

TECHNICAL FIELD

The present disclosure relates to reducing an operation amount for data labeling by using a computing device, and particularly, to a solution for determining a labeling priority for data.

BACKGROUND ART

According to the development of the artificial intelligence technology based on machine learning, the importance of the data required to train a machine learning model is growing day by day. For example, it is known that at least 100 million pixel-wise label images are required for autonomous vehicles. The importance of the data is represented by Garbage-In Garbage-Out (GIGO).

Supervised learning for training a machine learning model requires labeling for data. The data labeling is generally performed manually by a person. While the amount of data requiring labeling increases exponentially, the speed of a manual operation is limited. Accordingly, there may be a need in the art for a solution that enables efficient labeling.

U.S. patent application Ser. No. 16/027,161 discloses a method for selecting machine learning training data.

SUMMARY OF THE INVENTION

The present disclosure is conceived in response to the background art, and has been made to provide a solution for determining a labeling priority for data.

The technical objects of the present disclosure are not limited to the foregoing technical objects, and other non-mentioned technical objects will be clearly understood by those skilled in the art from the description below.

According to an exemplary embodiment of the present disclosure for achieving the object, a computer program stored in a computer readable storage medium is disclosed. The computer program may include instructions for causing one or more processors to perform the following steps, and the steps may include: generating a data subset including at least two or more data from an unlabeled entire dataset; generating two or more training datasets from the data subset, in which the two or more training datasets includes at least one pair of a sampled data subset, and in which each of at least one pair of the sampled data subset includes different validation datasets; and training a plurality of inference models, based on the two or more training datasets and corresponding labeling values.

The generating of the two or more training datasets from the data subset may include generating a plurality of training datasets, each of which includes a unique validation dataset, based on the training dataset.

The generating of the plurality of training datasets, each of which includes a unique validation dataset, based on the training dataset may include: dividing the training dataset into N lower-level data subsets; and allocating at least one of the N lower-level data subsets as the validation dataset.

The plurality of inference models may include two or more network functions including different structures.

According to another exemplary embodiment of the present disclosure for achieving the object, a computer program stored in a computer readable storage medium is disclosed. The computer program may include instructions for causing one or more processors to perform the following steps, and the steps may include: generating a plurality of inference results for a random data, based on a plurality of inference models including one or more network functions which are trained based on two or more training datasets and corresponding labeling values; and providing the plurality of inference results for the random data.

The plurality of inference results may include a classification result that each inference model infers about the random data, and a confidence score which is related to the classification result.

The providing of the plurality of inference results for the random data may include: generating a single inference result for the random data based on the plurality of inference results for the random data; and providing the single inference result.

The determining of the single inference result may include labeling a pseudo label to corresponding random data, when the single inference result satisfied predetermined criteria.

The labeling of the pseudo label to corresponding random data when the single inference result satisfied predetermined criteria may include determining a classification prediction result included in the single inference result as a pseudo label for the random data, when an uncertainty value included in the single inference result is equal or less than a preset threshold.

The providing of the single inference result may further include determining a labeling priority corresponding to the single inference result, against a random data which the pseudo label is not labeled.

The determining of the labeling priority corresponding to the single inference result against a random data which the pseudo label is not labeled may include: allocating a first priority to the random data, when an uncertainty value of the random data is equal or less than a first preset threshold; allocating a second priority to the random data, when an uncertainty value of the random data is more than the first preset threshold and equal or less than a second preset threshold; and allocating a third priority to the random data, when an uncertainty value of the random data is more than the second preset threshold.

The plurality of inference models may include two or more network functions including different structures.

According to another exemplary embodiment of the present disclosure for achieving the object, a computing device for determining a labeling priority is disclosed. The computing device may include: a processor; a storage unit; and a network unit, in which the processor is configured to: generate a data subset including at least two or more data from an unlabeled entire dataset; generate two or more training datasets from the data subset, in which the two or more training datasets includes at least one pair of sampled data subset, and in which each of at least one pair of sampled data subset includes different validation datasets; and train a plurality of inference models, based on the two or more training datasets and corresponding labeling values.

According to another exemplary embodiment of the present disclosure for achieving the object, a computing device for determining a labeling priority is disclosed. The computing device may include: a processor; a storage unit; and a network unit, in which the processor is configured to: generate a plurality of inference results for a random data, based on a plurality of inference models including one or more network functions which are trained based on two or more training datasets and corresponding labeling values; and provide the plurality of inference results for the random data.

The technical solutions obtainable from the present disclosure are not limited to the foregoing solutions, and other non-mentioned solution will be clearly understood by those skilled in the art from the description below.

The present disclosure relates to a solution for determining a labeling priority for data.

The effects obtainable from the present disclosure are not limited to the foregoing effects, and other non-mentioned effects will be clearly understood by those skilled in the art from the description below.

BRIEF DESCRIPTION OF THE DRAWINGS

Various aspects are described with reference to the drawings, and herein, like reference numerals are generally used to designate like constituent elements. In the exemplary embodiment below, for the purpose of description, a plurality of specific and detailed matters is suggested in order to provide general understanding of one or more aspects. However, it is apparent that the aspect(s) may be carried out without the specific and detailed matters.

FIG. 9 is a diagram illustrating an example of generating the plurality of inference results by the processor of the computing device according to an exemplary embodiment of the present disclosure.

DETAILED DESCRIPTION

Figure 1:
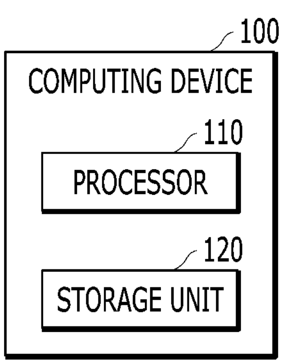
FIG. 1 is a block diagram illustrating a configuration of a computing device performing a method of determining a labeling priority for data according to an exemplary embodiment of the present disclosure.

Terms, "component", "module", "system", and the like used in the present specification indicate a computer-related entity, hardware, firmware, software, a combination of software and hardware, or execution of software. For example, a component may be a procedure executed in a processor 110, a processor 110, an object, an execution thread, a program, and/or a computer, but is not limited thereto. For example, both an application executed in a computing device 100 and the computing device 100 may be components. One or more components may reside within a processor 110 and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

A term "or" intends to mean comprehensive "or", not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

A term "include" and/or "including" shall be understood as meaning that a corresponding characteristic and/or a constituent element exists. Further, a term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear that a single form is indicated in the context, the singular shall be construed to generally mean "one or more" in the present specification and the claims.

Those skilled in the art shall recognize that the various illustrative logical blocks, configurations, modules, circuits, means, logic, and algorithm operations described concerning the exemplary embodiments additionally disclosed herein may be implemented by electronic hardware, computer software, or in a combination of electronic hardware and computer software. To exemplify the interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

The description of the presented exemplary embodiments is provided so as for those skilled in the art to use or carry out the present invention. Various modifications of the exemplary embodiments will be apparent to those skilled in the art. General principles defined herein may be applied to other exemplary embodiments without departing from the scope of the present disclosure. Therefore, the present invention is not limited to the exemplary embodiments presented herein. The present invention shall be interpreted within the broadest meaning range consistent with the principles and new characteristics presented herein.

In an exemplary embodiment of the present disclosure, a server may also include other configurations for performing a server environment of the server. The server may include any type of device. The server may be a digital device, such as a laptop computer, a notebook computer, a desktop computer, a web pad, and a mobile telephone, which is equipped with a processor 110 and includes a storage unit, and has computing ability. The server may be a web server processing a service. The foregoing kind of server is merely an example, and the present disclosure is not limited thereto.

In the present specification, a network function may be exchanged with an artificial neural network 200 and a neural network. In the present specification, the network function may also include one or more neural networks, and in this case, an output of the network function may be an ensemble of an output of one or more neural networks.

In the present specification, a model may include a network function. The model may also include one or more network functions, and in this case, an output of the model may be an ensemble of an output of one or more neural networks.

FIG. 1 is a block diagram illustrating a configuration of a computing device performing a method of determining a labeling priority for data according to an exemplary embodiment of the present disclosure.

A computing device 100 may include a processor 110 and a storage unit 120. The processor 110 may be formed of one or more cores, and may include a processor 110, such as a central processing unit (CPU), a general purpose graphics processing unit (GPGPU), and a tensor processing unit (TPU) of the computing device 100, for performing a method of determining a labeling priority for data. The processor 110 may read a computer program stored in the storage unit 120 and perform a method of determining a labeling priority for data according to an exemplary embodiment of the present disclosure. According to the exemplary embodiment of the present disclosure, the processor 110 may perform a calculation for training a neural network 200. The processor 110 may perform a calculation, such as processing of input data for learning in Deep Learning (DN), extraction of a feature from input data, an error calculation, and updating of a weight of the neural network 200 by using backpropagation, for training the neural network 200.

At least one of the CPU, GPGPU, and TPU of the processor 110 may generate a training dataset 500 and process the training of a plurality of inference models 600. Further, in the exemplary embodiment of the present disclosure, a plurality of inference results 700 using the trained model may be generated, and the plurality of inference results 700, a single inference result, and a pseudo label may be provided by using the processors 110 of the plurality of computing devices 100 together. Further, the computer program executed in the computing device 100 according to the exemplary embodiment of the present disclosure may be a CPU, GPGPU, or TPU executable program.

The storage unit 120 may store a computer program for performing the method of determining a labeling priority for data according to the exemplary embodiment of the present disclosure, and the stored computer program may be read and driven by the processor 110.

The storage unit 120 according to the exemplary embodiment of the present disclosure may store a program for an operation of the processor 110, and may also temporarily or permanently store input/output data (for example, service entrance information, user information, and replacement service access information). The storage unit 120 may store data for a display and a sound. The storage unit 120 may include at least one type of storage medium among a flash memory type, a hard disk type, a multimedia card micro type, and the card type of memory (for example, an SD or XD memory), a Random Access Memory (RAM), a Static Random Access Memory (SRAM), a Read-Only Memory (ROM), an Electrically Erasable Programmable Read-only Memory (EEPROM), a Programmable Read-Only Memory (PROM), a magnetic memory, a magnetic disk, and an optical disk.

Figure 2:
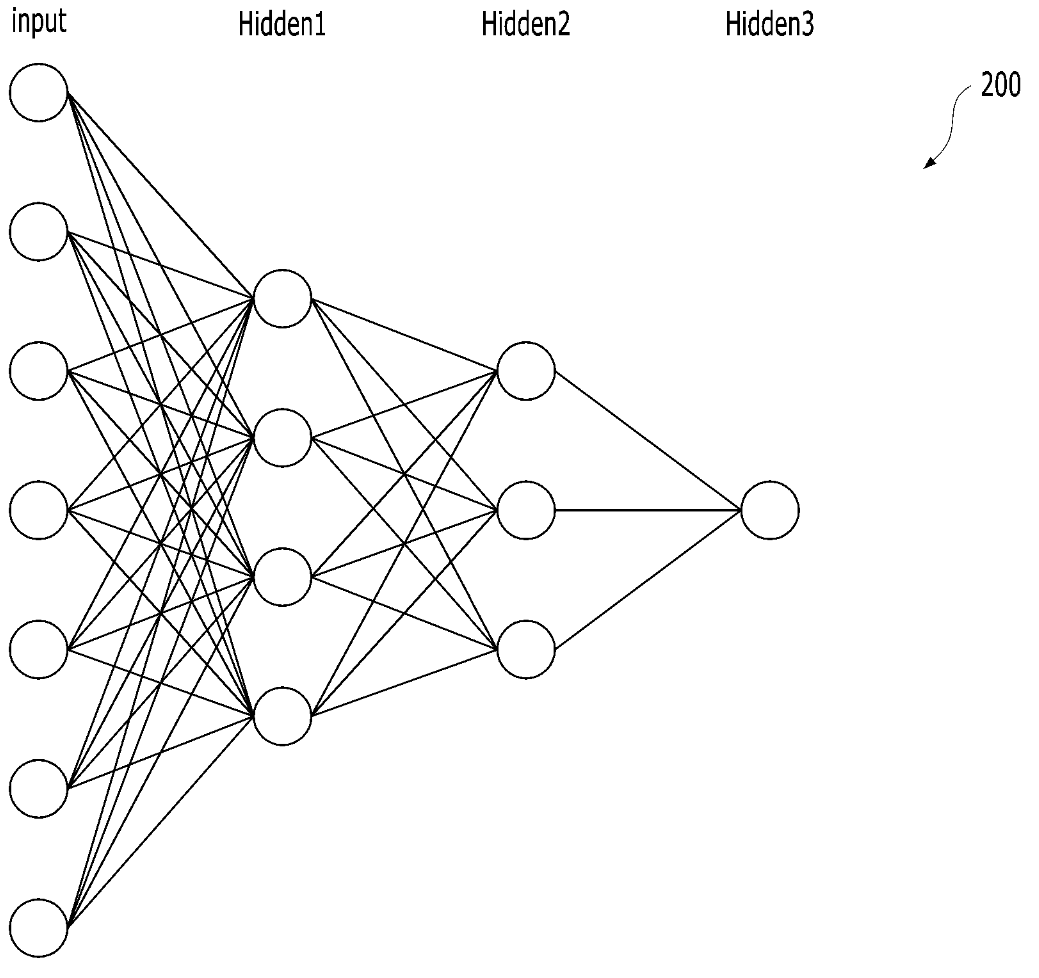
FIG. 2 is a schematic diagram illustrating a part of an artificial neural network according to an exemplary embodiment of the present disclosure.

FIG. 2 is a schematic diagram illustrating a part of an artificial neural network according to an exemplary embodiment of the present disclosure.

Throughout the present specification, the neural network 200, a network function, and a neural network may be used as the same meaning. The neural network 200 may consist of a set of interconnected computational units, which may generally be referred to as "nodes". The "nodes" may also be called "neurons". The neural network 200 consists of one or more nodes. The nodes (or neurons) configuring the neural network 200 may be interconnected by one or more "links".

In the neural network 200, one or more nodes connected through the links may relatively form a relation of an input node and an output node. The concept of the input node is relative to the concept of the output node, and a predetermined node having an output node relationship to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node may be determined based on data input to the input node. Herein, a node connecting the input node and the output node may have a weight. The weight is variable, and for the neural network 200 to perform a desired function, the weight may be varied by a user or an algorithm. For example, when one or more input nodes are connected to one output node by links, respectively, a value of the output node may be determined based on values input to the input nodes connected to the output node and weights set in the link corresponding to each of the input nodes.

As described above, in the neural network 200, one or more nodes are connected through one or more links to form a relation of an input node and an output node in the neural network 200. A characteristic of the neural network 200 may be determined according to the number of nodes and links in the neural network 200, a correlation between the nodes and the links, and a weight assigned to each of the links. For example, when there are two neural networks 200 in which the numbers of nodes and links are the same and the weights between the links are different, the two neural networks 200 may be recognized to be different from each other.

As illustrated in FIG. 2, the neural network 200 may consist of one or more nodes. Some of the nodes configuring the neural network 200 may form one layer based on distances from an initial input node. For example, a set of nodes having a distance of n from an initial input node may form n layers. The distance from the initial input node may be defined by the minimum number of links, which needs to be passed from the initial input node to a corresponding node. However, the definition of the layer is arbitrary for the description, and a degree of the layer in the neural network 200 may be defined by a different method from the foregoing method. For example, the layers of the nodes may be defined by a distance from a final output node.

The initial input node may mean one or more nodes to which data is directly input without passing through a link in a relation with other nodes among the nodes in the neural network 200. Otherwise, the initial input node may mean nodes that do not have other input nodes connected through the links in a relation between the nodes based on the link in the neural network 200. Similarly, the final output node may mean one or more nodes that do not have an output node in a relation with other nodes among the nodes in the neural network 200. Further, the hidden node may mean nodes configuring the neural network 200, not the initial input node and the final output node. In the illustration of FIG. 2, the output node is omitted. In the neural network 200 according to the exemplary embodiment of the present disclosure, the number of nodes of the input layer may be larger than the number of nodes of the hidden layer close to the output layer, and the neural network 200 may be in the form that the number of nodes decreases from the input layer to the hidden layer.

A deep neural network (DNN) 200 may mean the neural network 200 including a plurality of hidden layers, in addition to an input layer and an output layer. When the DNN is used, it is possible to recognize a latent structure of data. That is, it is possible to recognize the latent structures of pictures, texts, videos, voices, and music (for example, an object included in the picture, the contents and the emotion of the text, and the contents and the emotion of the voice). The DNN may include a convolutional neural network (CNN), a recurrent neural network (RNN), a restricted Boltzmann machine (RBM), a deep belief network (DBN), a Q network, a U network Siamese network, and the like.

Figure 3:
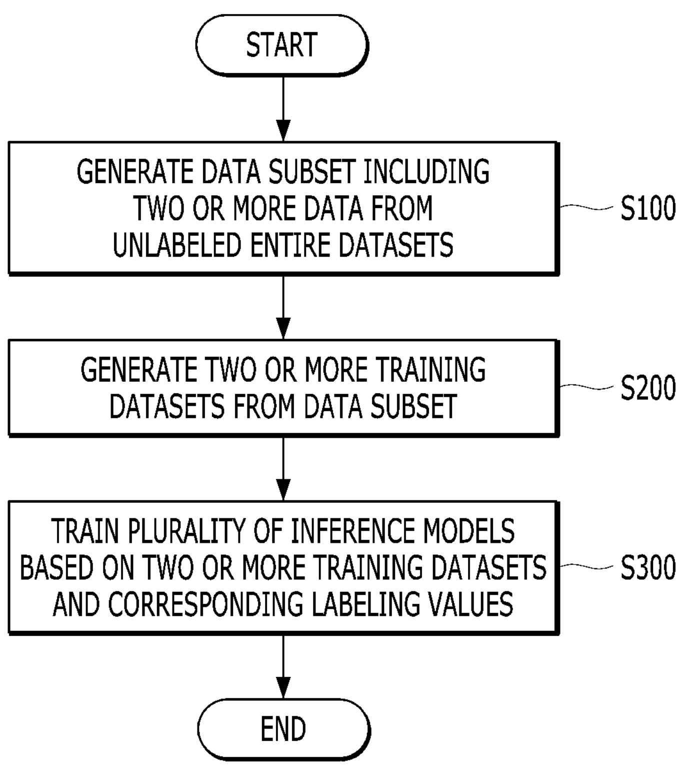
FIG. 3 is a flowchart illustrating an example in which a processor of the computing device trains a plurality of inference models according to an exemplary embodiment of the present disclosure.

FIG. 3 is a flowchart illustrating an example in which a processor of the computing device trains a plurality of inference models according to an exemplary embodiment of the present disclosure.

Referring to FIG. 3, the processor 110 may generate a labeled data subset 400 including two or more data from unlabeled entire datasets 300 (S100).

The entire datasets 300 according to the present disclosure may include data that does not undergo a labeling operation by a manual operation or a classifier/classification model. Further, in the exemplary embodiment of the present disclosure, the entire datasets may also include at least a part of the labeled data.

The processor 110 may generate a data subset 400 from the unlabeled entire datasets 300. The processor 110 may generate the labeled data subset 400 by sampling the entire datasets 300. Hereinafter, in the present disclosure, the labeled data subset may mean a subset of the dataset including only the labeling completed data.

The processor 110 may generate an unlabeled data subset from the unlabeled entire datasets 300. Herein, in order to generate the unlabeled data subset, the processor 110 may generate an unlabeled data subset by sampling the data from the unlabeled entire datasets 300. Particularly, the processor 110 may generate an unlabeled data subset by applying a random sampling method to the unlabeled entire datasets 300.

The processor 110 may generate a labeled data subset 400 by performing a labeling operation on the unlabeled data subset. As described above, the labeling operation may also be performed by a user. Further, the labeling operation may also be performed by a classifier/classification model trained by the labeling operation. Further, the labeling operation may also be performed by an unsupervised learning or clustering method.

The method of determining a labeling priority for data according to the present disclosure may be a solution to reduce the number of operations required for labeling by generating a pseudo label by classifying inference results based on a predetermined reference or performing labeling only for some data by using the model trained with the labeled data subset 400.

It is assumed that the unlabeled entire datasets 300 have a sufficient amount of data. When the processor 110 generates the labeled data subset 400 including the sufficient number of data by sampling (particularly, random sampling) the unlabeled entire datasets 300, the labeled data subset 400 may be representative for the entire datasets 300 that is a population.

As described above, the model trained based on the labeled data subset 400 may also well operate for the unlabeled entire datasets 300. Accordingly, it may not be necessary to go through a labeling operation on all of the data included in the unlabeled entire datasets 300. Accordingly, it is possible to reduce the number of data that is the target of labeling by the method of determining a labeling priority according to the present disclosure, thereby reducing the amount of operations required for labeling.

The processor 110 may generate two or more training datasets 500 from the data subset based on the generated labeled data subset 400.

The processor 110 may generate a training dataset 500 including at least one pair of sampled data subsets including different validation datasets.

The training dataset 500 according to some exemplary embodiments of the present disclosure may include at least a part of the data of the labeled data subset 400. However, the training dataset 500 may be formed of one or more data subsets which are mutually exclusive, and may include the validation dataset. Herein, the validation dataset may be sampled from the data subset 400. That is, the training dataset 500 may consist of the pair of sampled data subsets.

Herein, the labeled data subset 400 may be defined as a dataset for training the plurality of inference models 600 according to the present disclosure. According to several exemplary embodiments of the present disclosure, the labeled data subset 400 may have been labeled already. The labeling to generate the labeled data subset 400 may be performed manually or by a classifier/classification model trained for labeling. Particularly, as the method of labeling the labeled data subset 400, unsupervised learning or clustering may be used.

To generate the plurality of inference models 600, each of the plurality of training datasets 500 may be derived from the labeled data subset 400. Each training dataset 500 may include at least a part of the different data. The training dataset 500 will be described below in detail regarding FIG. 4.

As described above, the model trained based on the labeled data subset 400 may also be well operated for the unlabeled entire dataset 300. Accordingly, it may not be necessary to go through a labeling operation on all of the data included in the unlabeled entire datasets 300. Accordingly, the amount of operation consumed for labeling may be reduced by the method of determining a labeling priority according to the present disclosure.

The processor 110 may train the plurality of inference models 600 based on the two or more generated training datasets 500 and a labeling value corresponding to at least a part of the data included in the training dataset (S300).

The processor 110 may generate the plurality of inference models 600 to perform an evaluation on each of the data included in the labeled data subset 400 by training the plurality of inference models 600.

The processor 110 according to the present disclosure may train the plurality of inference models 600 based on the plurality of training datasets 500. The processor 110 may perform an evaluation on each of the data by synthesizing the plurality of prediction results generated from the plurality of inference models 600, which will be described below.

The processor 110 may use an ensemble method for synthesizing the plurality of prediction results. Herein, the ensemble method may be defined as a method of creating several prediction models based on given data and creating one final prediction model by combining the several prediction models.

The processor 110 according to the present disclosure may use average, majority vote, Bayesian interference, and the like as a particular method for implementing the ensemble method.

The plurality of inference models 600 corresponds to the plurality of training datasets 500, respectively. Each of the inference models 600 is trained based on the training dataset in the data included in the training dataset 500. Several inference models 600 may be generated from one training dataset 500, and in this case, the processor 110 may determine the kind of model which is to be provided as one of the plurality of inference models 600 for implementing the method of determining a labeling priority for data according to the present disclosure based on the validation dataset. Each of the plurality of determined inference models 600 may generate an inference result for the unlabeled entire datasets 300. Herein, the inference result may include a classification result (for example, a label) for specific data and a confidence score for the corresponding classification result. However, the classification result and the confidence score are merely the examples for the inference result, and the data which may be included in the inference result is not limited thereto.

Herein, the confidence score may be defined as a probability for each label settable for random data. For example, for image A, when a probability that image A is classified as "dog" is 0.4 and a probability that image A is classified as "cat" is 0.6, a confidence score of image A may be 0.4 for a dog, and may be 0.6 for a cat. The foregoing confidence score is merely an example, and the present disclosure is not limited thereto.

In order to perform the method of determining a labeling priority for data according to the present disclosure, it is necessary to perform labeling on the labeled data subset 400. Accordingly, it can be said that the smaller the size of the labeled data subset 400, the better it is. In the exemplary embodiment of the present disclosure, only a part of the inference models may be trained by using the labeled data.

Herein, when the plurality of inference models 600 is trained based on the training dataset 500 including different validation datasets as described above, the plurality of training datasets 500 may be generated with one labeled data subset 400. Accordingly, even though the labeled data subset 400 includes the relatively small amount of data, it is possible to effectively train the plurality of inference models 600.

Figure 4:
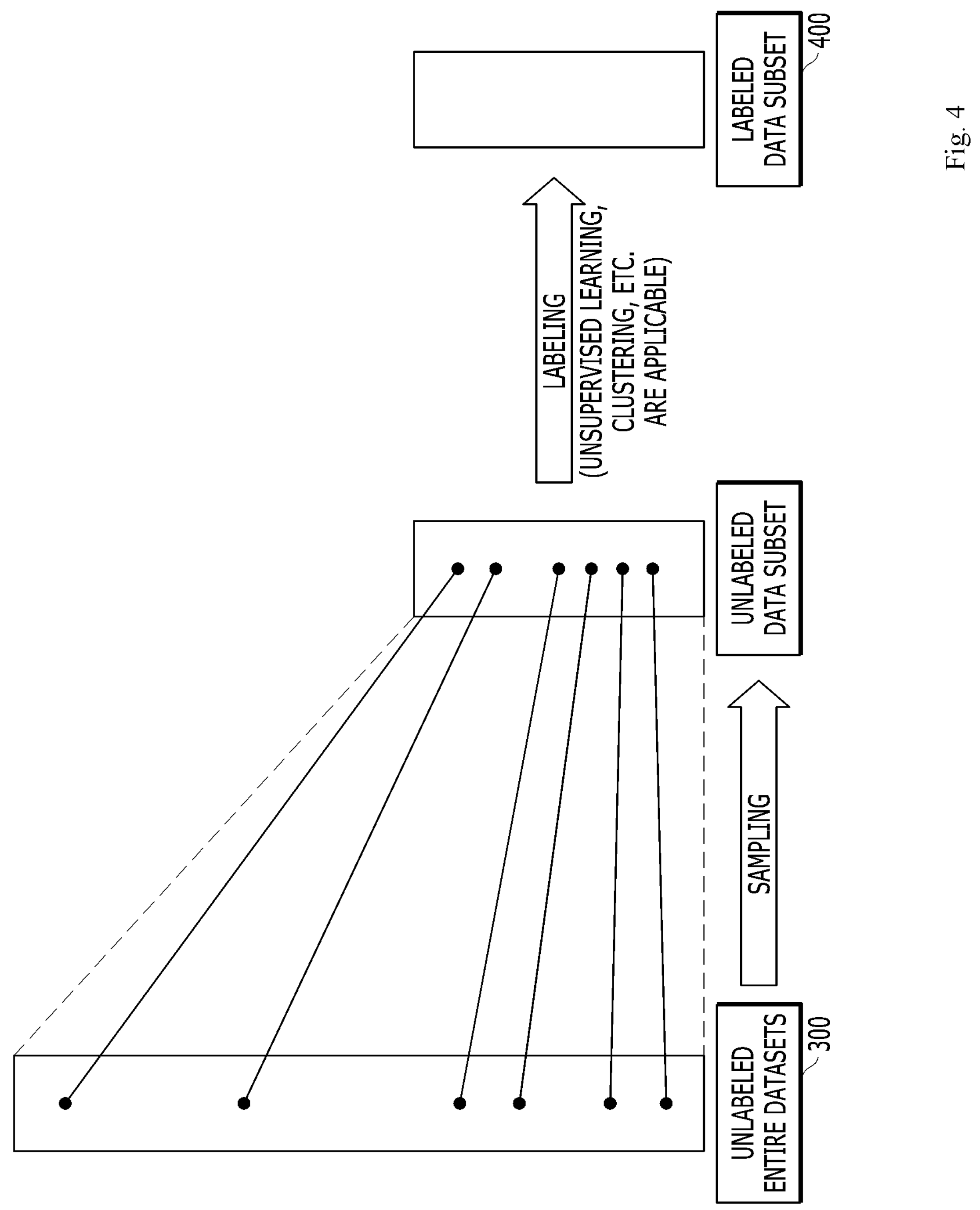
FIG. 4 is a diagram illustrating an example of generating a data subset from entire datasets by the processor of the computing device according to an exemplary embodiment of the present disclosure.

FIG. 4 is a diagram illustrating an example of generating a data subset from entire datasets by the processor of the computing device according to an exemplary embodiment of the present disclosure.

The processor 110 may generate an unlabeled data subset from the unlabeled entire datasets 300. Herein, in order to generate the unlabeled data subset, the processor 110 may sample the unlabeled data subset from the unlabeled entire datasets 300. Particularly, the processor 110 may generate an unlabeled data subset by applying a random sampling method to the unlabeled entire datasets 300.

The processor 110 may generate a labeled data subset 400 by performing a labeling operation on the unlabeled data subset. As described above, the labeling operation may be performed by an operator who is a person. Further, the labeling operation may be performed by a classifier/classification model trained for a labeling operation. Further, the labeling operation may also be performed by an unsupervised learning or clustering method.

The method of determining a labeling priority for data according to the present disclosure may be a solution to reduce the amount of operations required for labeling by classifying an inference result based on predetermined criteria by using the model trained with the labeled data subset 400.

It may be assumed that the unlabeled entire dataset 300 includes a sufficient amount of data. When the processor 110 generates the labeled data subset 400 including the sufficient number of labeled data by sampling (particularly, random samplings) and labeling the unlabeled entire datasets 300, the labeled data subset 400 may be representative for the entire datasets 300 that is a population.

According to the foregoing, the model trained based on the labeled data subset 400 may also well operate for the unlabeled entire datasets 300. Accordingly, it may not be necessary to go through a labeling operation on all of the data included in the unlabeled entire datasets 300. Accordingly, the amount of operation consumed for labeling may be reduced by the method of determining a labeling priority according to the present disclosure.

Figure 5:
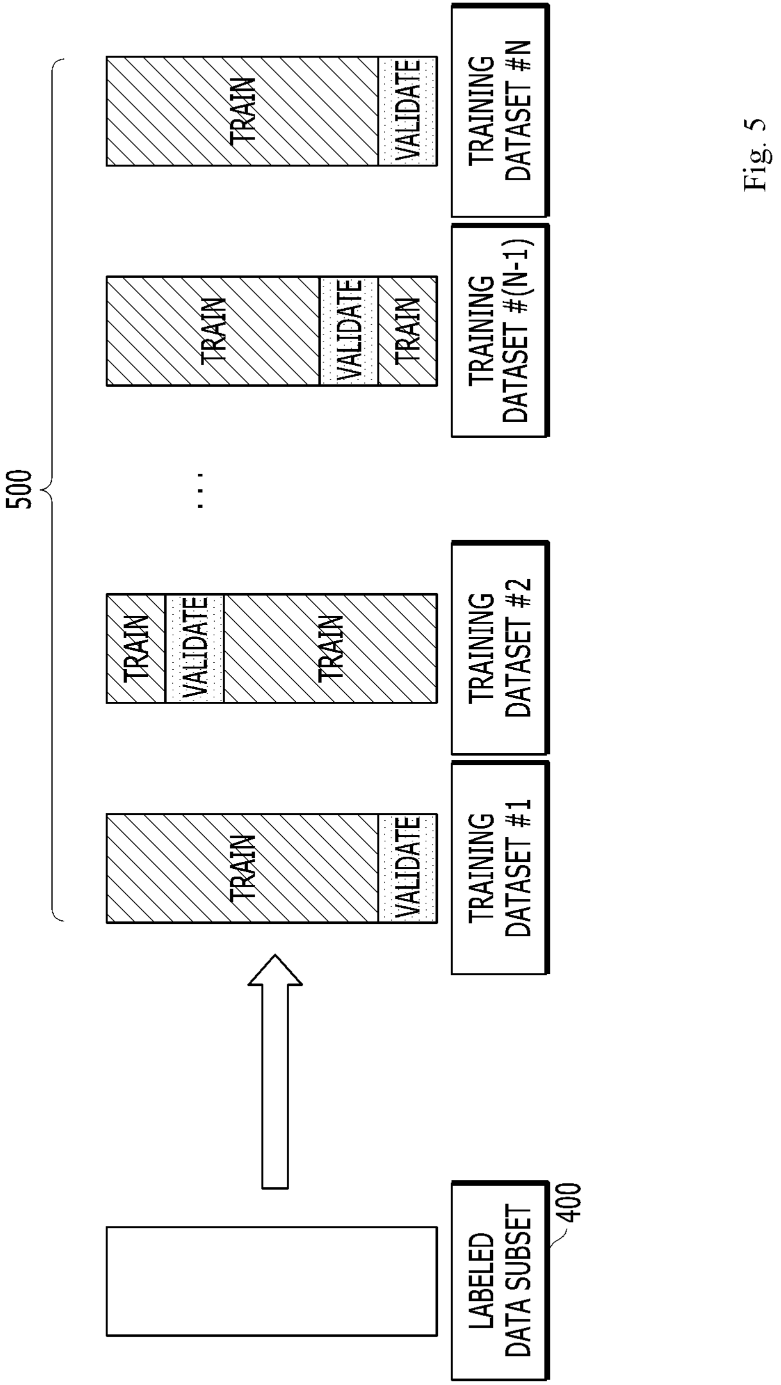
FIG. 5 is a diagram illustrating an example of generating a plurality of training datasets from data subsets by the processor of the computing device according to an exemplary embodiment of the present disclosure.

FIG. 5 is a diagram illustrating an example of generating the plurality of training datasets from the data subsets by the processor of the computing device according to an exemplary embodiment of the present disclosure.

In order to generate the plurality of training datasets 500 from one labeled data subset 400, a K-fold cross validation method may be generally used. The K-fold cross validation may be defined as a method of dividing a dataset into several datasets and using each dataset as a test (validation) set, and combining and using the remaining datasets as a training set. The K-fold cross validation may be useful when data for training the model is not sufficient.

Accordingly, each of the training datasets 500 may include a training dataset 500*a* and a validation dataset 500*b*, each of which at least a part is different from each other.

Herein, the training dataset 500*a* may mean a dataset including one or more data for training the plurality of inference models. Similarly, the validation dataset 500_b_ may mean a dataset including one or more data for evaluating the performance of each inference model trained based on the training dataset 500_a_.

Herein, in the exemplary embodiment of the present disclosure, the processor 110 may allocate random data randomly selected to include at least a part of the different data as the validation dataset 500_b_ when generating two or more training datasets 500 from the labeled data subset 400. According to the exemplary embodiment of the present disclosure, the processor 110 may allocate random data randomly selected so as not to include the same data as the validation dataset 500_b_ when generating two or more training datasets 500 from the data subset 400.

In order to perform the method of determining a labeling priority for data according to the present disclosure, the labeling needs to be essentially performed for the labelled data subset 400. Accordingly, it can be said that the smaller the size of the labeled data subset 400, the better it is.

Herein, as described above, when the plurality of inference models 600 is trained based on the plurality of training datasets 500 each of which includes the different validation dataset 500_b_, the large amount of training datasets 500 may be generated with one labeled data subset 400. Accordingly, even though the labeled data subset 400 includes the relatively small amount of data, it is possible to effectively train the plurality of inference models 600.

Figure 6:
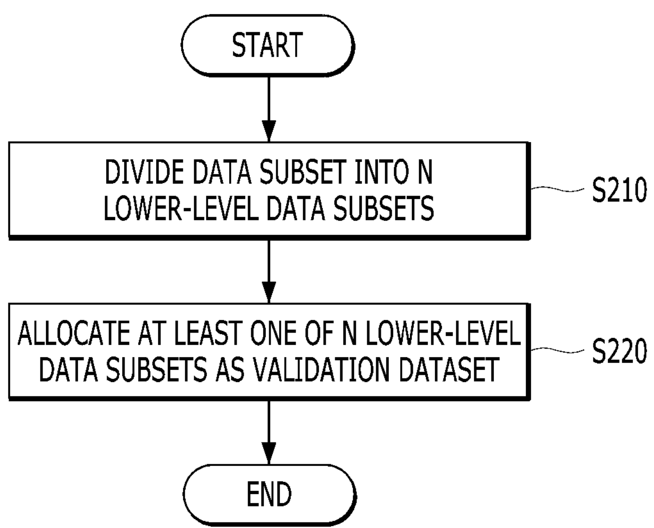
FIG. 6 is a flowchart illustrating an example of generating the plurality of training datasets by the processor of the computing device according to an exemplary embodiment of the present disclosure.

FIG. 6 is a flowchart illustrating an example of generating the plurality of training datasets by the processor of the computing device according to an exemplary embodiment of the present disclosure.

Referring to FIG. 6, the processor 110 may divide the data subset into N lower-level data subsets.

The processor 110 may allocate at least one of the N divided lower-level data subsets as the validation dataset 500_b_ (S220).

This is one example for selecting the validation dataset 500_b_ for performing the K-fold cross validation. Accordingly, the particular method of generating the training dataset 500 is not limited thereto.

As described above, each of the datasets included in the training dataset 500 is mutually exclusive. That is, each of the datasets included in the training dataset 500 cannot include the same element. Accordingly, when the validation dataset is first determined, the processor 110 may allocate the remaining datasets as the training dataset.

Figure 7:
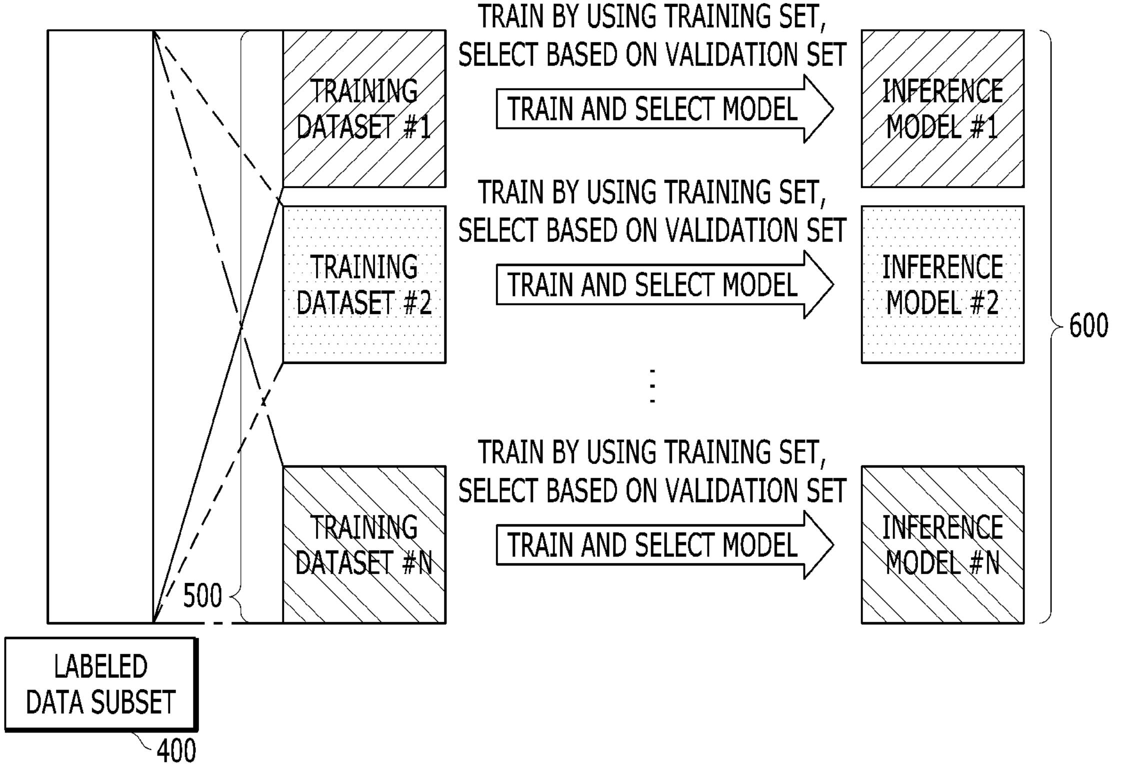
FIG. 7 is a diagram illustrating an example of generating a plurality of inference models by the processor of the computing device according to an exemplary embodiment of the present disclosure.

FIG. 7 is a diagram illustrating an example of generating a plurality of inference models by the processor of the computing device according to an exemplary embodiment of the present disclosure.

The processor 110 may generate the plurality of inference models 600 based on two or more training datasets 500. As described above, multiple inference models may be generated for one training dataset 500. In this case, the determination of the inference model 600 that may be one among the plurality of inference models may be performed based on the validation dataset 500_b_.

Herein, the form of the network function of each of the plurality of inference models 600 may be different. As widely known, the form of the network function for implementing deep learning may be various. Accordingly, the plurality of inference models 600 may be formed of the same network function or the different network functions.

When the form of the network function of the plurality of inference models 600 is variously formed, it is possible to obtain the results through various models for the same data. The plurality of inference models according to the present disclosure may be trained by the labeled data subset 400 including the relatively small amount of data. Accordingly, the performance itself of each of the inference models for obtaining uncertainty, which will be described below, may be uncertain. In this case, when the ensemble method is performed by using the plurality of inference models having the different training data and the different network forms, it is possible to obtain a more generalized result for the unlabeled entire dataset 300 even based on the small amount of training data. Further, since it is possible to avoid a biased result for a specific data type, it is easy to synthesize the results of the various models and perform an evaluation on the data. Accordingly, it is possible to better objectify the performance of the model even with using the relatively small amount of training data.

Figure 8:
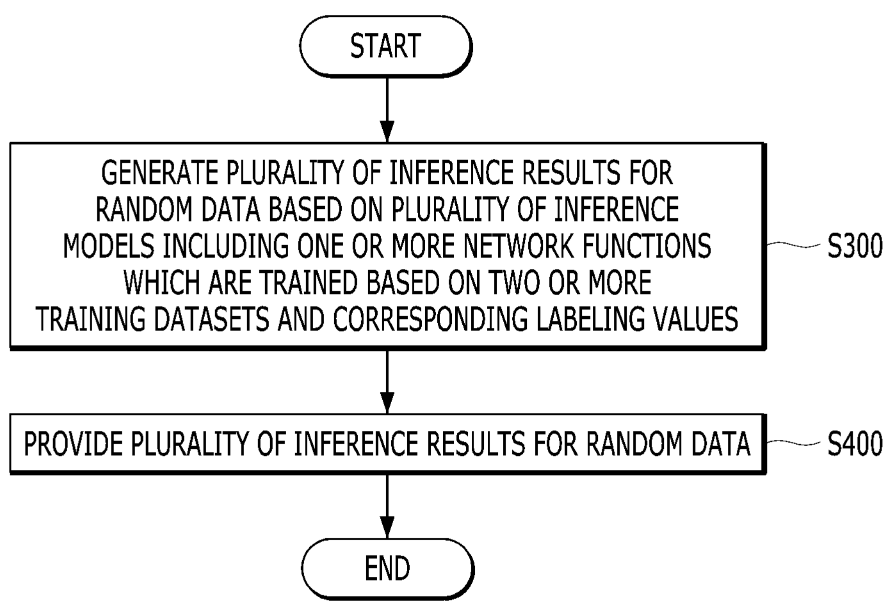
FIG. 8 is a flowchart illustrating an example of providing the plurality of inference results by the processor of the computing device according to an exemplary embodiment of the present disclosure.

FIG. 8 is a flowchart illustrating an example of providing the plurality of inference results by the processor of the computing device according to an exemplary embodiment of the present disclosure.

Referring to FIG. 8, the processor 110 may generate a plurality of inference results 700 for random data based on the plurality of inference models 600 including one or more network functions which are trained based on two or more training datasets 500 and the labeling values corresponding to the two or more training datasets 500 (S300).

According to operation S300, for each of the data included in the unlabeled entire dataset 300, an inference result for a classification value of each of the plurality of inference models 600 is generated. That is, inference model #1, inference model #2, . . . , and inference model #N may generate the inference results for the classification values for data #1, data #2, data #3, . . . and data #N, respectively. Herein, the inference result may include a prediction label and a confidence score for a label prediction result. The image illustrated in the drawing is simply one type of the data, and the data is not limited to the image in the present disclosure.

Herein, the random data may be defined as one data randomly selected from the data included in the unlabeled entire datasets 300.

The processor 110 may provide a plurality of inference results 700 for the generated random data (S400).

The processor 110 may provide a user related to the computing device 100 with the plurality of inference results which the plurality of inference models 600 generates for the data included in the unlabeled entire datasets 300, respectively. That is, the processor 110 may provide the user with a classification prediction result and a certainty value for each classification prediction result generated for each of the data by each inference model 600. However, this is merely an example for the information included in the plurality of inference results 700, and the plurality of inference results 700 is not limited thereto.

When the plurality of inference results 700 is provided to the user related to the computing device 100, the user may recognize a classification prediction level of the model for each data type based on the plurality of inference results 700. That is, the user may allocate a high data labeling priority to the type of data with poor classification prediction. Accordingly, the data labeling of the user may be efficiently performed.

FIG. 9 is a diagram illustrating an example of generating the plurality of inference results by the processor of the computing device according to an exemplary embodiment of the present disclosure.

The plurality of inference results 700 generated by the processor 110 may be defined as the classification results inferred by the plurality of inference models 600 for each of the data included in the unlabeled entire datasets 300, respectively. That is, inference model #1, inference model #2, . . . , and inference model #NM may generate the inference results for data #1, data #2, data #3, . . . and data #N, respectively. Herein, the inference result may include a prediction label and a confidence score for a label prediction result.

The processor 110 may generate a single inference result by synthesizing the generated inference results. This will be described in detail with reference to FIG. 11.

Figure 10:
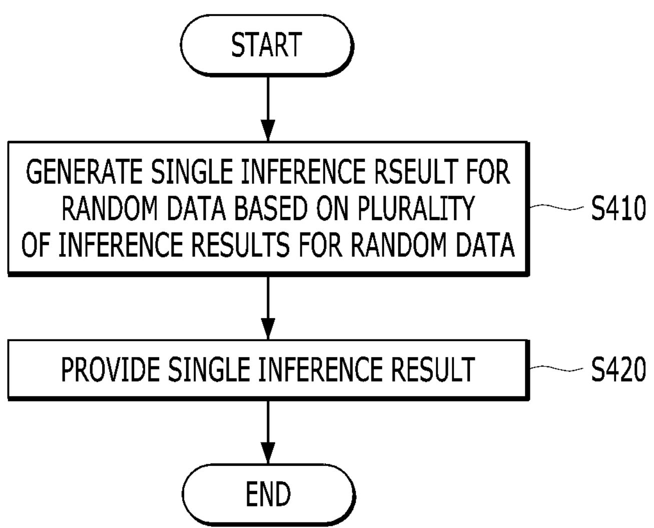
FIG. 10 is a flowchart illustrating an example of providing a single inference result for random data by the processor of the computing device according to an exemplary embodiment of the present disclosure.

FIG. 10 is a flowchart illustrating an example of providing a single inference result for random data by the processor of the computing device according to an exemplary embodiment of the present disclosure.

Referring to FIG. 10, the processor 110 may generate a single inference result for the random data based on the plurality of inference results 700 for the random data (S410).

The processor 110 may provide the determined single inference result (S420). Herein, the single inference result means one result generated for the random data based on (or by synthesizing) the plurality of inference results 700. The single inference result may include the classification prediction result for specific data. The single inference result may be an inference reliability value for the classification prediction result for the corresponding data. Further, the single inference result may be an uncertainty value computed based on the inference reliability value. It can be understood that the higher the inference reliability value and the lower the uncertainty value, the more confident the inference results for specific data.

For example, in the case where all of the plurality of models generate the classification prediction results that the object shown in the specific image is a dog, when an average of probabilities (reliability) that all of the plurality of inference models 600 predict the object illustrated in the corresponding data as a dog is 0.88, the single inference result may be "0.88".

The uncertainty value is computed based on the inference reliability value. Accordingly, in this case, for example, the uncertainty value may be a value obtained by subtracting the inference reliability value of "0.12" from 1. The description for the method of computing the uncertainty value is merely an example, and the present disclosure is not limited thereto.

Herein, the ensemble method may be defined as a method of creating several prediction models based on given data and creating one final prediction model by combining the several prediction models.

The processor 110 according to the present disclosure may use average, majority vote, Bayesian interference, and the like as a particular method for implementing the ensemble method.

As described above, when the single inference result is generated by using the ensemble method and the like, it is known that better performance than that of the inference by the single model is exhibited.

The processor 110 may determine a pseudo label and a labeling priority based on the single inference result including the inference reliability value or the uncertainty value which will be described later with reference to FIG. 11. Accordingly, it is possible to distinguish the data that requires labeling from the data that does not require labeling. Further, when there are limited available resources usable for labeling, the data that requires preferential labeling may be distinguished. Accordingly, the labeling operation may be efficiently performed.

Figure 11:
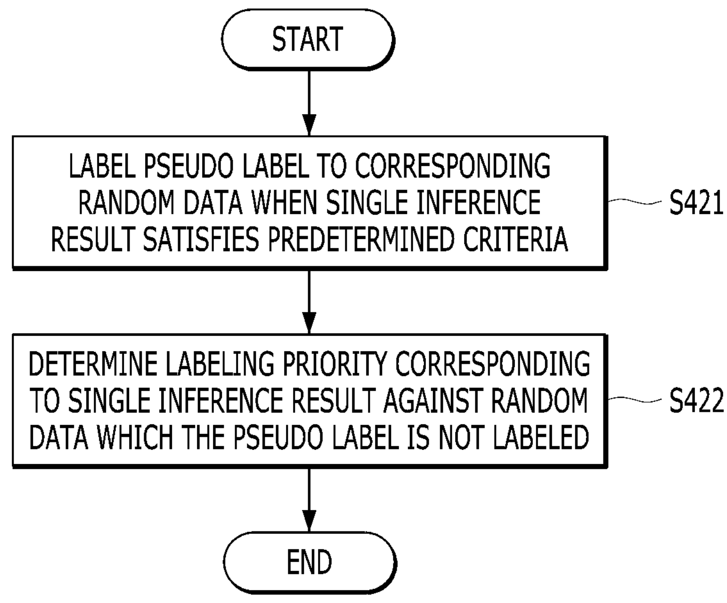
FIG. 11 is a flowchart illustrating an example of determining a single inference result by the processor of the computing device according to an exemplary embodiment of the present disclosure.

FIG. 11 is a flowchart illustrating an example of determining a single inference result by the processor of the computing device according to an exemplary embodiment of the present disclosure.

Herein, the single inference result means one result generated for the random data based on (or by synthesizing) the plurality of inference results 700. The single inference result may be an inference reliability value for the labeling of the corresponding data. Further, the single inference result may be an uncertainty value computed based on the inference reliability value. It can be understood that the higher the inference reliability value and the lower the uncertainty value, the more confident the inference results for specific data.

Referring to FIG. 11, the processor 110 may determine a single inference result for the random data based on the plurality of inference results for the random data.

When the determined single inference result satisfies predetermined criteria, the processor 110 may allocate a pseudo label to the corresponding random data (S421).

The pseudo label may be a classification result allocated according to the predetermined method to each of the data included in the unlabeled entire datasets 300 by the according to the present disclosure processor 110. The data which the pseudo label is labeled is identically treated as the labeled data, so that an operation of additional labeling may not be required.

The processor 110 may allocate a pseudo label when the single inference result satisfies the predetermined criteria. For example, when the inference reliability value that is one example of the single inference result is equal to or larger than a preset threshold, the processor 110 may recognize that the predetermined criteria is satisfied. For another example, when the uncertainty value that is another example of the single inference result is less than the preset threshold, the processor 110 may recognize that the predetermined criteria is satisfied.

Herein, when the uncertainty value included in the single inference result is equal to or smaller than the preset threshold, the processor 110 may determine the classification prediction result included in the single inference result as the pseudo label for the random data.

For example, the processor 110 may set the pseudo label to be allocated to the data of which the uncertainty value is equal to or less than 0.15. According to the single inference result for the random data, when the classification prediction result for the random data is a cat and the uncertainty value in this case is 0.1, the processor 110 may allocate the pseudo label of "cat" to the corresponding random data.

The processor 110 may determine a labeling priority corresponding to the single inference result against the random data which the pseudo label is not labeled (S422).

According to several exemplary embodiments of the present disclosure, the processor 110 may determine a labeling priority for random data by the method described below. The processor 110 may determine a labeling priority by comparing the uncertainty value included in the single inference result for the random data with one or more thresholds.

Particularly, when the uncertainty value for the random data is equal to or smaller than a preset first threshold, the processor 110 may allocate a first priority to the random data. Further, when the uncertainty value for the random data is larger than the first threshold and is equal to or smaller than a second threshold, the processor 110 may allocate a second priority to the random data. Further, when the uncertainty value for the random data is larger than the second threshold, the processor 110 may allocate a third priority to the random data.

Herein, for example, it may be assumed that the first threshold is smaller than the second threshold. In this case, when the uncertainty value is smaller than the first threshold, it may be determined that the uncertainty value is considerably small even though it is not low enough to allocate a pseudo label. Accordingly, in this case, it may be determined that the inference models are well trained for the corresponding type of data. Accordingly, the processor 110 may allocate a low labeling priority to the corresponding type of data. Accordingly, in the foregoing example, the first priority may mean a low labeling priority.

When the uncertainty value is larger than the first threshold and is smaller than the second threshold, it may be determined that the uncertainty value is moderate. Accordingly, in this case, it cannot be said that the inference models are well trained for the corresponding type of data. Accordingly, the processor 110 may allocate the moderate priority to the corresponding type of data. Accordingly, in the foregoing example, the second priority may mean a moderate labeling priority.

Last, when the uncertainty value is larger than the second threshold, it may be determined that the uncertainty value is large. Accordingly, in this case, it may be determined that the inference models are not well trained for the corresponding type of data. Accordingly, the processor 110 may allocate the high labeling priority to the corresponding type of data. Accordingly, in the foregoing example, the third priority may mean a high labeling priority.

The determined priority may be tagged to the data and provided to the user. The following information may be provided together with the priority tagged to the data.

The data of the type that is tagged with the first priority because the uncertainty value is smaller than the first threshold may be estimated to have a fairly reliable pseudo label. Accordingly, when the labeling priority information is provided, information that the pseudo label is highly reliable may be included in the labeling priority information. Accordingly, the information may enable the user receiving the information to use the pseudo label as it is for the data of the type tagged with the first priority when the labeling resource is not sufficient.

The data of the type of which the uncertainty value is between the first threshold and the second threshold and which is tagged with the second priority may be understood that the reliability of the pseudo label is doubtable. Accordingly, when the labeling priority information is provided, information that the reliability of the pseudo label is doubtful may be included in the labeling priority information. Accordingly, the information may enable the user receiving the information to determine whether to trust the pseudo label or whether to perform manual labeling.

The data of the type of which the uncertainty value is larger than the second threshold and which is tagged with the third priority may be understood that the reliability of the pseudo label is low. Accordingly, when the labeling priority information is provided, information that the reliability of the pseudo label is low may be included in the labeling priority information. Accordingly, the information may enable the user receiving the information to determine that the manual data labeling is essential and insert the resource for labeling to the corresponding type of data with a top priority.

The foregoing example is merely the examples of the determination of the labeling priority and the critical meaning of the threshold related to the labeling priority, so that the method of determining the labeling priority is not limited thereto.

Only some data of the entire datasets 300 may require the labeling operation by the provision of the pseudo label and the provision of the labeling priority. Further, the labeling priority is provided, so that the resources distributed for the labeling may be efficiently used.

Figure 12:
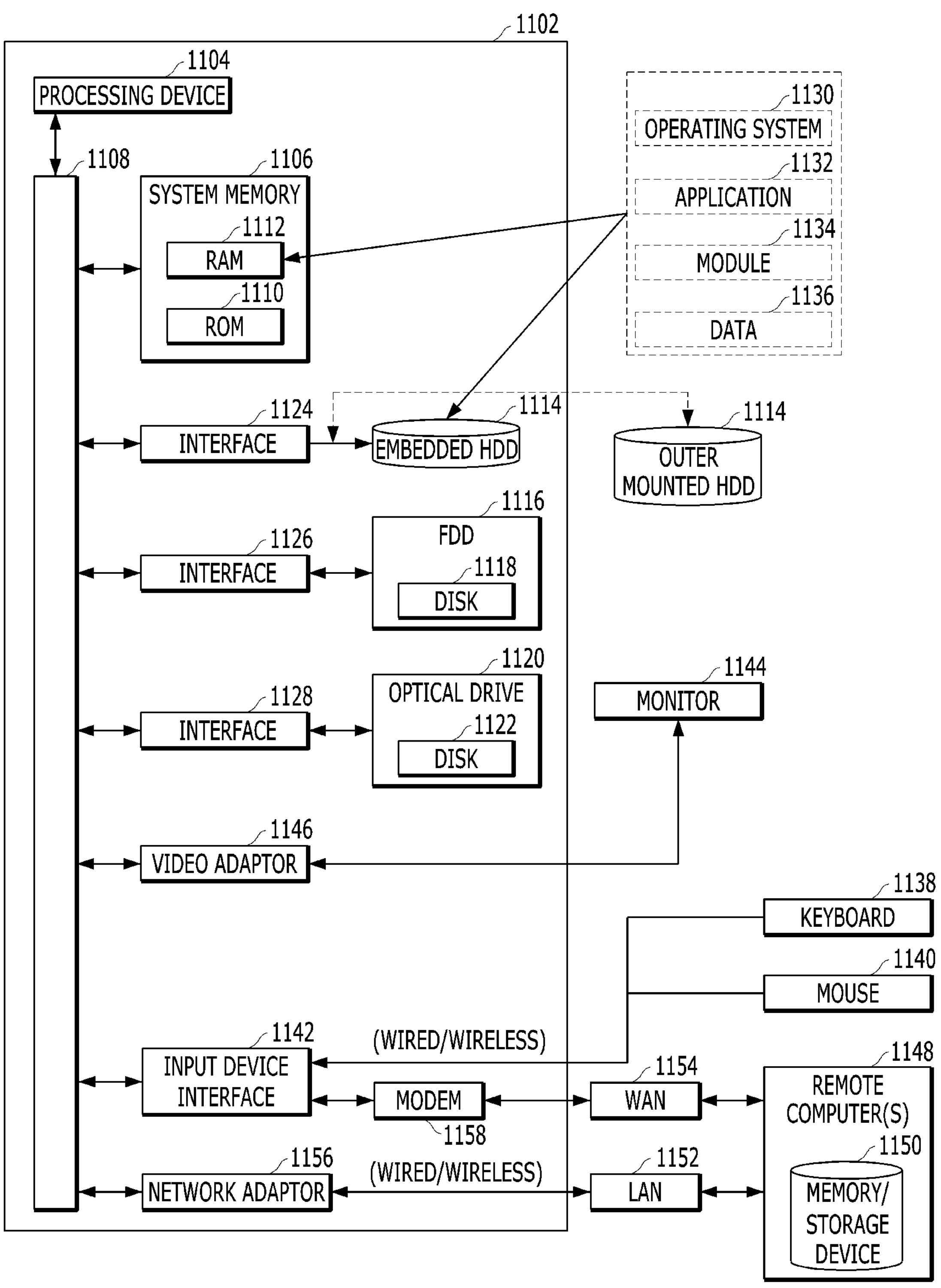
FIG. 12 is a simple and general schematic diagram illustrating an example of a computing environment in which several exemplary embodiments of the present disclosure are implementable.

FIG. 12 is a simple and general schematic diagram illustrating an example of a computing environment in which several exemplary embodiments of the present disclosure are implementable.

A computer 1102 illustrated in FIG. 12 may correspond to at least one of the computing devices 100 performing the method of determining a labeling priority for data according to the present disclosure.

The present disclosure has been generally described in relation to a computer executable command executable in one or more computers, but those skilled in the art will appreciate well that the present disclosure is combined with other program modules and/or be implemented by a combination of hardware and software.

In general, a module in the present specification includes a routine, a procedure, a program, a component, a data structure, and the like performing a specific task or implementing a specific abstract data form. Further, those skilled in the art will appreciate well that the method of the present disclosure may be carried out by a personal computer, a hand-held computing device 100, a microprocessor 110-based or programmable home appliance (each of which may be connected with one or more relevant devices and be operated), and other computer system configurations, as well as a single-processor 110 or multiprocessor 110 computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be positioned in both a local memory storage device and a remote storage unit storage device.

The computer generally includes various computer readable media. The computer readable medium is a computer accessible medium, and includes volatile and non-volatile media, transitory and non-transitory media, and portable and non-portable media. As a non-limited example, the computer readable medium may include a computer readable storage medium and a computer readable transmission medium.

The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a Random Access Memory (RAM), a Read Only Memory (ROM), an Electrically Erasable and Programmable ROM (EEPROM), a flash memory, or other storage unit technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium implements a computer readable command, a data structure, a program module, or other data in a modulated data signal, such as a carrier wave or other transport mechanisms, and generally includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, radio frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system storage unit 1106, and a system bus 1108. The system bus 1108 connects system components including the system storage unit 1106 (not limited) to the processing device 1104. The processing device 1104 may be a predetermined processor 110 among various commonly used processors 110. A dual processor 110 and other multi-processor 110 architectures may also be used as the processing device 1104.

The system bus 1108 may be a predetermined one among several types of bus structure, which may be additionally connectable to a local bus using a predetermined one among a storage unit bus, a peripheral device bus, and various common bus architectures. The system storage unit 1106 includes a ROM 1110, and a RAM 1112. A basic input/output system (BIOS) is stored in a non-volatile storage unit 1110, such as a ROM, an erasable and programmable ROM (EPROM), and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for outer mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable storage media, the HDD, the portable magnetic disk, and the portable optical media, such as a CD, or a DVD, are mentioned, but those skilled in the art will well appreciate that other types of computer readable storage media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be appreciated well that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a server computer, a router, a personal computer, a portable computer, a microprocessor 110-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication server on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote storage unit/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art will appreciate that the various illustrative logical blocks, modules, processors 110, means, circuits, and algorithm operations described in relation to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. A term "machine-readable medium" includes a wireless channel and various other media, which are capable of storing, holding, and/or transporting a command(s) and/or data, but is not limited thereto.

It shall be understood that a specific order or a hierarchical structure of the operations included in the presented processes is an example of illustrative accesses. It shall be understood that a specific order or a hierarchical structure of the operations included in the processes may be re-arranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics suggested herein.

What is claimed is:

1. A non-transitory computer readable medium storing a computer program that comprises instructions for causing one or more processors to perform the following steps comprising:

generating a labeled data subset including at least two or more data from an unlabeled entire data set;

generating two or more training data sets from the same labeled data subset of the unlabeled entire data set, wherein each of the two or more training data sets includes at least one pair of a sampled data subset, and wherein each of at least one pair of the sampled data subset includes a different validation data set; and training a plurality of inference models having different neural network architectures, based on the two or more training data sets and a labeling value corresponding to at least a part of the data included in the two or more training data sets by synthesizing a plurality of prediction results that are generated from the plurality of inference models by creating a plurality of prediction models based on the data in the two or more training data sets and combining the plurality of prediction models using an ensemble method to generate a final prediction model, wherein the ensemble method determines a confidence score for each prediction result, wherein the final prediction model generates a single inference result by synthesizing the plurality of prediction results using at least one of averaging, majority vote, or Bayesian inference to compute an uncertainty value, and wherein the final prediction model automatically determines, based on the confidence scores, data from the unlabeled entire data set to be labeled.

2. The non-transitory computer readable medium according to claim 1, wherein the generating the two or more training data sets from the data subset comprises:

generating a plurality of training data sets, each of which includes a unique validation data set, based on the two or more training data sets.

3. The non-transitory computer readable medium according to claim 2, wherein the generating a plurality of training data sets, each of which includes a unique validation data set, based on the two or more training data sets comprises:

dividing the two or more training data sets into N data subsets; and allocating at least one of the N data subsets as the validation data set.

4. The non-transitory computer readable medium according to claim 1, wherein the plurality of inference models includes two or more network functions including different structures.

5. The non-transitory computer readable medium according to claim 1 further comprising:

generating a plurality of inference results for random data including data in the unlabeled entire data set, based on the plurality of inference models including one or more network functions which are trained based on two or more training data sets and a corresponding labeling value; and providing the plurality of inference results for the random data.

6. The non-transitory computer readable medium according to claim 5, wherein the plurality of inference results includes a classification result that each inference model infers about the random data, and a confidence score which is related to the classification result.

7. The non-transitory computer readable medium according to claim 5, wherein the providing the plurality of inference results for the random data comprises:

generating a single inference result for the random data based on the plurality of inference results for the random data; and providing the single inference result.

8. The non-transitory computer readable medium according to claim 7, wherein the generating a single inference result for the random data based on the plurality of inference results of the random data comprises:

labeling a pseudo label to corresponding random data, when the single inference result satisfied predetermined criteria.

9. The non-transitory computer readable medium according to claim 8, wherein the labeling a pseudo label to corresponding random data, when the single inference result satisfied predetermined criteria comprises:

determining a classification prediction result included in the single inference result as a pseudo label for the random data, when an uncertainty value included in the single inference result is equal or less than a preset threshold.

10. The non-transitory computer readable medium according to claim 8, wherein the providing the single inference result comprises:

determining a labeling priority corresponding to the single inference result, against random data that has not been assigned a pseudo label.

11. The non-transitory computer readable medium according to claim 10, wherein the determining a labeling priority corresponding to the single inference result, against random data that has not been assigned a pseudo label:

allocating a first priority to the random data, when an uncertainty value of the random data is equal or less than a first preset threshold;

allocating a second priority to the random data, when an uncertainty value of the random data is more than the first preset threshold and equal to or less than a second preset threshold; and allocating a third priority to the random data, when an uncertainty value of the random data is more than the second preset threshold.

12. The non-transitory computer readable medium according to claim 5, wherein the plurality of inference models includes two or more network functions including different structures.

13. A computing device for determining a labeling priority, comprising: a processor; and a storage unit storing instructions that, when retrieved and executed, cause the processor to:

generate a labeled data subset including at least two or more data from an unlabeled entire data set;

generate two or more training data sets from the same labeled data subset of the unlabeled entire data set, wherein each of the two or more training data sets includes at least one pair of a sampled data subset, and wherein each of at least one pair of the sampled data subset includes a different validation data set; and train a plurality of inference models having different neural network architectures, based on the two or more training data sets and a labeling value corresponding to at least a part of the data included in the two or more training data sets by synthesizing a plurality of prediction results that are generated from the plurality of inference models by creating a plurality of prediction models based on the data in the two or more training data sets and combining the plurality of prediction models using an ensemble method to generate a final prediction model, wherein the ensemble method determines a confidence score for each prediction result, wherein the final prediction model generates a single inference result by synthesizing the plurality of prediction results using at least one of averaging, majority vote, or Bayesian inference to compute an uncertainty value, and wherein the final prediction model automatically determines, based on the confidence scores, data from the unlabeled entire data set to be labeled.

14. The computing device of claim 13, wherein the instructions further cause the processor to:

generate a plurality of inference results for random data including data in the unlabeled entire data set, based on the plurality of inference models including one or more network functions which are trained based on the two or more training data sets and a corresponding labeling value; and provide the plurality of inference results for the random data.

15. The computing device of claim 13, wherein the instructions further cause the processor to generate a plurality of training data sets, each of which includes a unique validation data set, based on the two or more training data sets.

16. The computing device of claim 13, wherein the instructions further cause the processor to:

divide the two or more training data sets into N data subsets; and allocate at least one of the N data subsets as the validation data set.

17. The computing device of claim 13, wherein the plurality of inference models includes two or more network functions including different structures.

18. The computing device of claim 13, wherein the instructions further cause the processor to:

generate a plurality of inference results for random data including data in the unlabeled entire data set, based on the plurality of inference models including one or more network functions which are trained based on the two or more training data sets and a corresponding labeling value;

generate a single inference result for the random data based on the plurality of inference results for the random data; and provide the single inference result.

19. The computing device of claim 18, wherein the instructions further cause the processor to label a pseudo label to corresponding random data, when the single inference result satisfied predetermined criteria.

20. The computing device of claim 19, wherein the instructions further cause the processor to determine a labeling priority corresponding to the single inference result, against random data that has not been assigned a pseudo label.

* * * * *